| (12) | United States Patent<br>Li et al. | (10) Patent No.: US 9,317,527 B2<br>(45) Date of Patent: Apr. 19, 2016 |
|---|---|---|

(54) METHOD AND APPARATUS FOR REGION SAMPLING AND ESTIMATION IN LOCATION BASED NETWORKS

(71) Applicants: Yanhua Li, Minneapolis, MN (US); Moritz M. Steiner, Montclair, NJ (US)

(72) Inventors: Yanhua Li, Minneapolis, MN (US); Moritz M. Steiner, Montclair, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 876 days.

(21) Appl. No.: 13/626,984

(22) Filed: Sep. 26, 2012

(65) Prior Publication Data

US 2014/0089333 A1 Mar. 27, 2014

(51) Int. Cl.
*G06F 17/30* (2006.01)

(52) U.S. Cl.
CPC ................ *G06F 17/30241* (2013.01)

(58) Field of Classification Search
CPC ............................................... G06F 2221/0708
See application file for complete search history.

(56) References Cited

U.S. PATENT DOCUMENTS

| 5,798,923 A * | 8/1998 | Laskowski ............. G06T 17/05 345/418 |
| 2009/0319306 A1* | 12/2009 | Chanick ............. G01C 21/3679 705/5 |
| 2012/0071174 A1 | 3/2012 | Boa et al. | |
| 2012/0190380 A1* | 7/2012 | Dupray .................. G01S 1/026 455/456.1 |

OTHER PUBLICATIONS

Yu, Dantong et al: "ClusterTree: Integration of Cluster Representation and Nearest-Neighbor Search for Large Data Sets with High Dimensions", IEEE Transactions on Knowledge and Data Engineering, vol. 15, No. 5, Sep./Oct. 2003, pp. 1316-1337.
International Search Report for PCT/US2013/059575, mailed Dec. 6, 2013, which corresponds to this present application, 5 pages.
"Places-Facebook": (https://www.facebook.com/about/location); "Where are you?" example: Retrieved from (http://touch.facebook.com/home.php?refsrc=http://touch.facebook.com/ . . . ). Retrieved Nov. 6, 2012.
"Foursquare Home Page": (http://www.foursquare.com). Retrieved Nov. 6, 2012.
"Foursquare Developers": (https://developer.foursquare.com/overview/venues). Retrieved Nov. 6, 2012.
"Foursquare House Rules": (https://foursquare.com/info/houserules). Retrieved Nov. 6, 2012.
"Foursquare" From Wikipedia, the free encyclopedia: (http://en.wikipedia.org/wiki/Foursquare). Retrieved Nov. 6, 2012.

(Continued)

*Primary Examiner* — Belix M Ortiz Ditren
(74) *Attorney, Agent, or Firm* — Carl Bilicska (57) ABSTRACT

Various embodiments provide a method and apparatus for obtaining a representative sample set of venues (i.e., places) within a geographic region in a location based network using a low cost and efficient sampling and estimating algorithm. In particular, a dynamic random region sampling algorithm randomly selects a target location within a geographic region and then determines a sub-region containing the target location within the geographic region based on venue density prediction. Venue density prediction is based on a weighted average of venue densities of two or more comparable locations within the geographic region.

18 Claims, 8 Drawing Sheets

(56) References Cited

OTHER PUBLICATIONS

"The Google Geocoding API": (https://developers.google.com/maps/documentation/geocoding/), Google Developers. Google Maps API Web Services. Last updated Oct. 30, 2012.
"Google + Local": (http://www.google.com/+/learnmore/local/). Retrieved Nov. 6, 2012.
"Foursquare Blog: A million check-ins isn't cool. You know what's cool?": (http://blog.foursquare.com/2011/09/20/billion/). Copyright 2009-2011 foursquare, Retrieved Nov. 6, 3012.
"Snowball sampling" From Wikipedia, the free encyclopedia: (http://en.wikipedia.org/wiki/Snowball_sampling). Retrieved Nov. 6, 2012.
Avrachenkov K. et al: "Improving Random Walk Estimation Accuracy with Uniform Restarts", INRIA, Sophia Antipolis Cedex (France), Dept. of Computer Science, University of Massachusetts Amherst, Amherst, MA, USA; inria-00520350, version 1, (Sep. 23, 2010), 17 pages. Published in Proc. Algorithms and Models for the Web-Graph—7th International Workshop, WAW 2010, Stanford, CA, USA, Dec. 13-14, 2010.
Bar-Yossef Z. et al: "Random Sampling from a Search Engine's Index", Published in:—Proceeding WWW '06 Proceedings of the 15th international conference on World Wide Web, WWW 2006, May 23-26, 2006, Edinburgh, Scotland, ACM 1-59593-323-9/06/0005, 10 pages.
Cho E et al: "Friendship and Mobility: User Movement in Location-Based Social Networks", Stanford University, KDD'11, Aug. 21-24, 2011, San Diego, California, USA, Copyright 2011 ACM 978-4503-0813—Jul. 11, 2008, 9 pages.
Markopoulou A et al: "Sampling Online Social Networks", University of California, Irvine and Sch. of Comput. & Comm. Sci., EPFL, Lausanne, Switzerland, In IEEE, JSAC 2011, 67 pages.
Gjoka, M et al: "Walking in Facebook: A Case Study of Unbiased Sampling of OSNs", University of California, Irvine and Sch. of Comput. & Comm. Sci., EPFL, Lausanne, Switzerland, In IEEE INFOCOM 2010 proceedings, 10 pages.
Katzir, L et al: "Estimating Sizes of Social Networks via Biased Sampling", Yahoo! Labs, Haifa, Israel, WWW2011 Mar. 28-Apr. 1, Hyderabad, India, copyright 2011, 9 pages.
Kurant, M et al: "Walking on a Graph with a Magnifying Glass: Stratified Sampling via Weighted Random Walks", University of California, Irvine, SIGMETRICS'11, Jun. 7-11, 2011, San Jose, California, USA. Copyright 2011 ACM 978-1-4503-0262—Mar. 11, 2006, 11 pages.
Kurant, M et al: "On the bias of BFS (Breadth First Search)", University of California, Irvine and Sch. of Comput. & Comm. Sci., EPFL, Lausanne, Switzerland, Teletraffic Congress (ITC), 2010 22nd International, Sep. 7-9, 2010, 8 pages.
Liu, H et al.: "Route Discovery from Mining Uncertain Trajectories", University of Florida, Gainesville, FL, USA, National Chiao Tung University, Hsinchu, Taiwan, Microsoft Research Asia, Beijing, China, 2011 11th IEEE International Conference on Data Mining Workshops, DOI 10.1109/ICDMW.2011.149, 4 pages.
Lohr, Sharon: "Sampling: Design and Analysis", 2nd Edition, 2010, Brooks/Cole, Cengage Learning, Boston, MA, 9 pages.
Meyn S et al.: "Markov Chains and Stochastic Stability", 2nd edition, 2009, Cambridge University Press, New York, New York, USA, pp. 426-427.
Noulas, A et al.: "An Empirical Study of Geographic User Activity Patterns in Foursquare", University of Cambridge, University College London, Proceedings of the Fifth International AAAI Conference on Weblogs and Social Media, copyright 2011, Association for the Advancement of Artificial Intelligence (www.aaai.org)., 4 pages.
Ribeiro, B et al.: "Sampling Directed Graphs with Random Walks", University of Massachusetts, Amherst, MA, Xi'an Jiaotong University, Xi'an, P.R. China, 2012 Proceedings IEEE INFOCOM, 978-1-4673-0775—Aug. 12, 2012 IEEE, 9 pages.
Ribeiro, B et al.: "Estimating and Sampling Graphs with Multidimensional Random Walks", University of Massachusetts, Amherst, MA, arXiv: 1002.1751V2 [cs.DS] Sep. 7, 2010, In Proc. of of the IMC, 2010, 16 pages.
Scellato, S et al.: "Socio-spatial Properties of Online Location-based Social Networks", University of Cambridge, Imperial College London, Proceedings of ICWSM, 2011—aaai.org, 8 pages.
Scellato, S et al.: "Exploiting Place Features in Link Prediction on Location-based Social Networks", University of Cambridge, KDD'11, Aug. 21-24, 2011, San Diego, California, USA, Copyright 2011 ACM 978-1-4503-0813—Jul. 11, 2008. 9 pages.
Wei L-Y et al.: "Constructing Popular Routes from Uncertain Trajectories", National Chiao Tung University, Hsinchu, Taiwan, Microsoft Research Asia, Beijing, China, KDD'12, Aug. 12-16, 2012, Beijing, China. Copyright 2012 ACM 1-58113-000-0/00/0010, 9 pages.
Zhong, M et al.: The Convergence-Guaranteed Random Walk and Its Applications in Peer-to-Peer Networks, University of Rochester, Rochester, NY, Computers, IEEE Transactions on May 2008, vol. 57, Issue: 5, 15 pages.
Zhou, J et al.: "Counting YouTube Videos via Random Prefix Sampling", University of Minnesota, Minneapolis, MN, USA, IMC'11, Nov. 2-4, 2011, Berlin, Germany, Copyright 2011 ACM 978-1-4503-1013-0/11/11, 7 pages.

* cited by examiner

Algorithm 1 InSearch $(G_0, V_0(G_0), V_0^{in}(G_0))$

---
1: INPUT: $G_0$ with size less than $\bar{a}$, $V_0(G_0)$ and $V_0^{in}(G_0)$;
2: OUTPUT: $V(G_0)$, $V^{in}(G_0)$ and # of queries $B_0$;
3: $V(G_0) = \emptyset$ and $B_0 = 0$;
4: if $s(G_0) \leq s_q$ then
5:    Return $V_0^{in}(G_0)$), $V_0(G_0)$, and $B_0$;
6: Divide $G_0$ into $G_0 = G_1 \vee G_2 \vee G_3 \vee G_4$;
7: Perform 4 API searches to retrieve $V_0^{in}(G_1)$, $V_0^{in}(G_2)$, $V_0^{in}(G_3)$, $V_0^{in}(G_4)$; $B_0 = B_0 + 4$;
8: $V_1^{in}(G_0) = V_0^{in}(G_1) \vee V_0^{in}(G_2) \vee V_0^{in}(G_3) \vee V_0^{in}(G_4)$;
9: if $|V_1^{in}(G_0) - V_0^{in}(G_0)| = 0$ and $|V_0(G_0)| < \bar{b}$ then
10:    Return $V_0^{in}(G_0)$, $V_0(G_0)$, and $B_0$;
11: else
12:    for $i = 1 : 4$ do
13:       $[V^{in}(G_i), V(G_i), B_i]$ = InSearch $(G_i, V_1(G_i), V_1^{in}(G_i))$;
14:       $B_0 = B_0 + B_i$;
15:    $V^{in}(G_0) = \bigcup_{i=1}^{4} V^{in}(G_i)$; $V(G_0) = \bigcup_{i=1}^{4} V(G_i)$;
16: Return $V^{in}(G_0)$, $V(G_0)$ and $B_0$;

Algorithm 2 Dynamic random region sampling algorithm

---

1: INPUT: API budget $B$, initial side length $s_0$, API return limit $\bar{b}$, $G$ bounded by $ll_{sw} = (lat_s, lng_w)$ and $ll_{ne} = (lat_n, lng_e)$
2: OUTPUT: Sample list $\mathcal{X} = [X_1, \cdots, X_m]$, where $X_t = V_t^{in}$.
3: $\varsigma_0 = \emptyset$; $c = 0$; $m = 0$; $\mathcal{X} = \emptyset$
4: Map $\mathcal{M} = \{(ll_{sw}, d_{sw}), (ll_{ne}, d_{ne})\}$, $d_{sw} = d_{ne} = \bar{b}/s_0^2$;
5: While $c < B$ do
6:   Choose $ll = (lat, lng)$ uniformly at random from $G$;
7:   if $ll$ is in any box $G_j \in \varsigma_0$ then
8:     $m = m + 1$; $\mathcal{X} = [\mathcal{X}, X_j]$, ($X_j$ : InSearch return on $G_j$);
9:     Continue;
10:  Choose $ll_1$ and $ll_2$ in $\mathcal{M}$ with smallest distance to $ll$;
11:  Predict the density around $ll$ as
     $d' = \sum_{i=1}^{2} dis^{-1}(ll, ll_i) d_i / \sum_{i=1}^{2} dis^{-1}(ll, ll_i)$;
12:  $s = \sqrt{\bar{b}/d'}$;
13:  Create $G_{ll}$ with center $(lat, lng)$ and side length $s$;
14:  if $G_{ll}$ overlaps with any box in $\varsigma_0$ then
15:     Cut $G_{ll}$ to be non-overlapping;
16:  Directly query $G_{ll}$ and obtain $V_0^{in}(G_{ll})$ and $V_0(G_{ll})$;
17:  $[V_m^{in}, V_m, B_m] = \text{InSearch}(G_{ll}, V_0^{in}(G_{ll}), V_0(G_{ll}))$;
18:  $X_m = V_m^{in}$; $d = |V_m^{in}|/a(G_{ll})$;
19:  $\varsigma_0 = \varsigma_0 \cup \{G_{ll}\}$; $c = c + B_m + 1$; $m = m + 1$; $\mathcal{X} = [\mathcal{X}, X_m]$;
20:  $\mathcal{M} = \{\mathcal{M}, (ll, d)\}$;

METHOD AND APPARATUS FOR REGION SAMPLING AND ESTIMATION IN LOCATION BASED NETWORKS

STATEMENT OF GOVERNMENT INTEREST

The present invention was made with government assistance under National Science Foundation (NSF) Grant No. CNS-0831734 awarded by the NSF. The government has certain rights in this invention.

TECHNICAL FIELD

The invention relates generally to methods and apparatus for providing venue collection in location based networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known location based networks (LBNs), collection of venue datasets are collected by traversing the entire network of a geographic region (e.g., performing an exhaustive search) to retrieve venue data such as users' friendship relations and venue checkins. In other known LBNs, collection of venue datasets are performed using sampling algorithms such as random walk or breath first search.

SUMMARY OF ILLUSTRATIVE EMBODIMENTS

Various embodiments provide a method and apparatus for obtaining a representative sample set of venues (i.e., places) within a geographic region in a location based network using a low cost and efficient sampling and estimating algorithm. In particular, a dynamic random region sampling algorithm randomly selects a target location within a geographic region and then determines a sub-region containing the target location within the geographic region based on venue density prediction. Venue density prediction is based on a weighted average of venue densities of two or more comparable locations within the geographic region.

In one embodiment, an apparatus is provided for providing venue datasets within a search region. The apparatus includes a data storage and a processor. The processor is programmed to: randomly select a target location in the search region; select a first comparable location, the first comparable location having a first venue density; select a second comparable location, the second comparable location having a second venue density; determine a sub-region within the search region based on the target location, the first and second comparable locations, and the first and second venue densities; and determine a set of in-venues within the sub-region. Where the first and second comparable locations are determined to have a higher relevance than other known locations within the search region.

In a second embodiment, a method is provided for providing venue datasets within a search region. The method includes: randomly selecting a target location in the search region; selecting a first comparable location, the first comparable location having a first venue density; selecting a second comparable location, the second comparable location having a second venue density; determining a sub-region within the search region based on the target location, the first and second comparable locations, and the first and second venue densities; and determining a set of in-venues within the sub-region. Where the first and second comparable locations are determined to have a higher relevance than other known locations within the search region.

In a third embodiment, a computer-readable storage medium is provided for storing instructions which, when executed by a computer, cause the computer to perform a method. The method includes selecting a first comparable location, the first comparable location having a first venue density; selecting a second comparable location, the second comparable location having a second venue density; determining a sub-region within the search region based on the target location, the first and second comparable locations, and the first and second venue densities; and determining a set of in-venues within the sub-region. Where the first and second comparable locations are determined to have a higher relevance than other known locations within the search region.

In any of the above embodiments, the processor is further programmed to: determine a sampling budget; and repeat (a)-(f) until the sampling budget is met. (a)-(f) includes: (a) randomly select a new target location in the search region; (b) select a new first comparable location, the new first comparable location having a new first venue density; (c) select a new second comparable location, the new second comparable location having a new second venue density; (d) determine a new sub-region within the search region based on the new target location, the new first and new second comparable locations, and the new first and new second venue densities; and (e) determine a set of new in-venues within the new sub-region. (f) Where the new first and new second comparable locations are determined to have a higher relevance than other known valid locations within the search region.

In any of the above embodiments, the processor is further programmed to trim the sub-region based on a determination that the sub-region overlaps with at least one of a plurality of other known sub-regions within the search region.

In any of the above embodiments, the processor is further programmed to randomly select a second target location in the search region and select the set of in-venues based on a determination that the second target location is located in the sub-region.

In any of the above embodiments, the area of the sub-region is based on a weighted average of the first and second comparable locations and the first and second venue densities.

In any of the above embodiments, the area of the sub-region is further based on a venue return limit.

In any of the above embodiments, the higher relevance is based on a distance between the first comparable location and the target location as compared to respective distances between the other known locations within the search region and the target location.

In any of the above embodiments, the higher relevance is further based on a first geographic terrain characteristic of the first comparable location and a second geographic terrain characteristic of the target location.

In any of the above embodiments, the higher relevance is further based an association between the orientation of the first comparable location with respect to the target location and the second comparable location with respect to the target location.

In any of the above embodiments, the determination of the set of in-venues comprises configuring the processor to perform an exhaustive venue search of the sub-region.

In any of the above embodiments, the method further includes trimming the sub-region based on a determination that the sub-region overlaps with at least one of a plurality of other known sub-regions within the search region.

In any of the above embodiments, the method further includes randomly selecting a second target location in the search region; and selecting the set of in-venues based on a determination that the second target location is located in the sub-region.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for obtaining a representative sample set of venues (i.e., places) within a geographic region in a location based network using a low cost and efficient sampling and estimating algorithm. In particular, a dynamic random region sampling algorithm randomly selects a target location within a geographic region and then determines a sub-region containing the target location within the geographic region based on venue density prediction. Venue density prediction is based on a weighted average of venue densities of two or more comparable locations within the geographic region.

Advantageously, dynamic random region sampling may be applied to relatively large regions such as cities or countries, and control the locality of the sampled users and venues.

Advantageously, a representative sampling of venues within a geographic region may be utilized to estimate various statistics, including total number of venues, checkin distributions, or the like. Such estimated statistics may provide useful insights in the understanding of different aspects of location based networks, such as popular route discovery and user mobility prediction used in targeted marketing.

Figure 1:
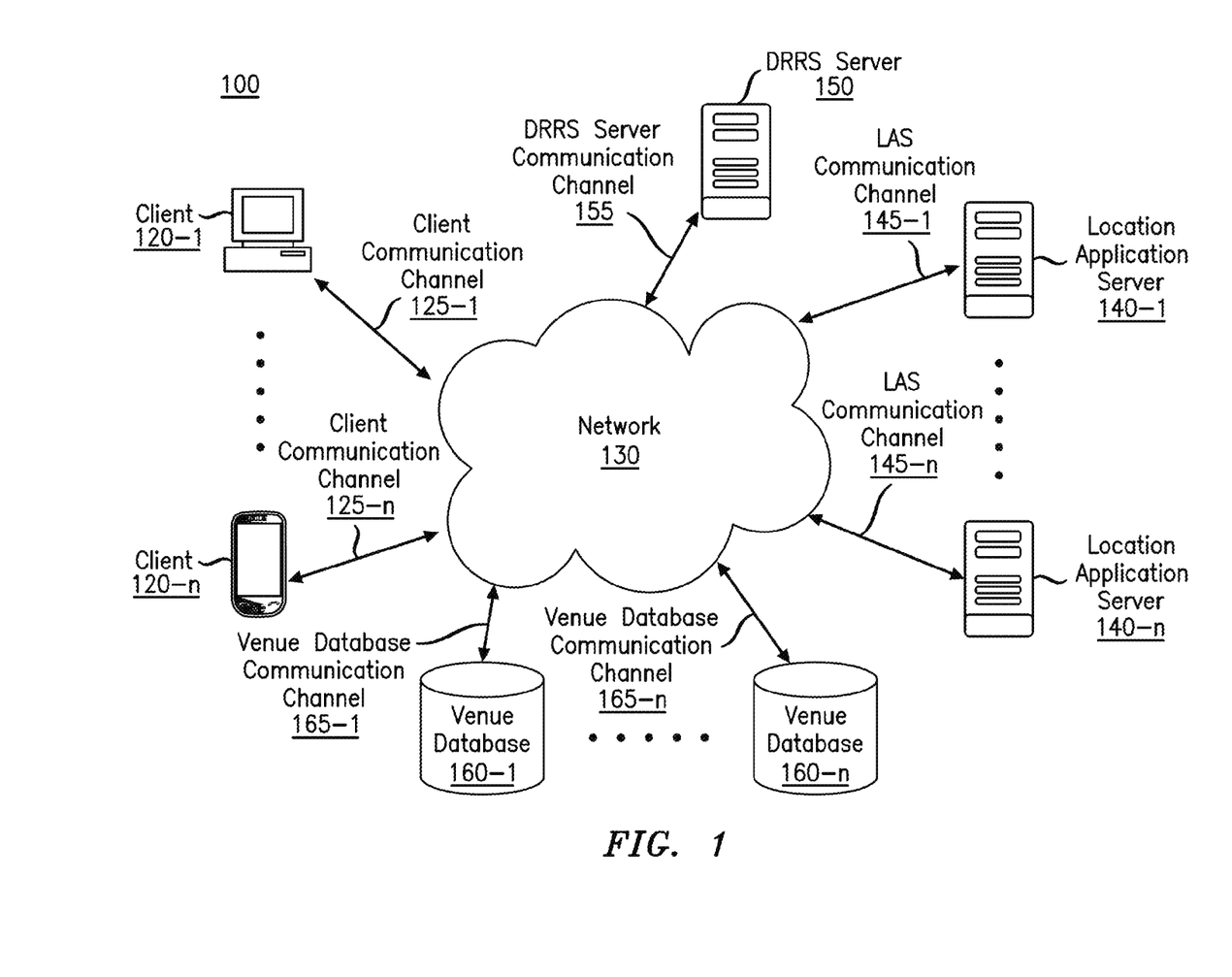
FIG. 1 illustrates a cloud network that includes an embodiment of a location based services system 100 for location based service applications.

FIG. 1 illustrates a cloud network that includes an embodiment of a location based services system 100 for location based service applications. The location based services system 100 includes one or more clients 120-1-120-n (collectively, clients 120) accessing one or more allocated location based services application instances (not shown for clarity) residing on one or more of location application servers 140-1-140-n (collectively, location application servers 140) over a communication path. The communication path includes an appropriate one of client communication channels 125-1-125-n (collectively, client communication channels 125), network 130, and one of LAS communication channels 145-1-145-n (collectively, LAS communication channels 145). The location based service application instances utilize representative sample set(s) of venues collected by DRSS server 150 from one or more of venue database 160-1-160-n (collectively, venue databases 160) over a DRRS communication path. The DRRS communication path includes DRRS server communication channel 155 and one or more of venue database communication channels 165-1-165-n (collectively, venue database communication channels 165).

Clients 120 may include any type of communication device(s) capable of sending or receiving information over network 130 via one or more of client communication channels 125. For example, a communication device may be a thin client, a smart phone (e.g., client 120-n), a personal or laptop computer (e.g., client 120-1), server, network device, tablet, television set-top box, media player or the like. Communication devices may rely on other resources within exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

The communication channels 125, 145, 155 and 165 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 145, 155 and 165 may be any number or combinations of communication channels.

The network 130 includes any number of access and edge nodes and network devices and any number and configuration of links. Moreover, it should be appreciated that network 130 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

Location application servers 140 may be any apparatus that provides location based services application instances. It should be appreciated that while only two location application servers are illustrated here, system 100 may include fewer or more location application servers.

DRRS server 150 may be any apparatus that obtains a set of venues within a geographic region from one or more of venue databases 160. In particular, the DRRS server 150 obtains a representative sample set of venues in a region from one or more of venue databases 160 to estimate various statistics, including total number of venues, checkin distributions, tips people left for that venue, or the like. It should be appreciated that while only one DRRS server is illustrated here, system 100 may include more DRRS servers.

Each of venue databases 160 are the persistent store of location (e.g., geographic) based information required by DRRS server 150. In particular, venue databases 160 provide a list of venues in a given geographic region to DRRS server 150. Moreover, at least one of venue databases 160 impose a return limit (e.g., no more than 50 venues per query are returned) and optionally a rate limit (e.g., 500 API queries per hour per authorized user) to restrict the query capacity of the venue search.

The term "venue" as used herein means a physical location. The term "location based information" as used herein includes any data associated with a particular venue. For example, location based information may be the number of people checked in at the venue, venue category (e.g., Arts & Entertainment or Pharmacy), a venue name (e.g., "CVS"), address, contact information, creation time, location rating, or the like.

It should be appreciated that in some embodiments, one or more of venue databases 160 may not provide all venues in geographic region response to a query. For example, there may be: (1) a small error rate (e.g., in some embodiments the error rate is one percent or less) in the return due to, for example, removed venues, new venues, duplicated venues, incorrectly entered venues, or the like; (2) venues sharing the same location such as, for example, planes or taxis; or (3) venues subject to privacy controls such as, for example, venues identified as "private" (e.g., "Home (Private)" venues in Foursquare are obfuscated by assigning them a common location). The term "in-venue" as used herein means those venues within a requested geographic region returned in response to a query of one or more of databases 160 for the venues within the requested geographic region. Similarly, the term "out-venue" as used herein means those venues outside a requested geographic region that are returned in response to a query of one or more of databases 160 for the venues within the requested geographic region. It should be appreciated that $\text{Venues}^{IN} + \text{Venues}^{OUT} = \text{Venues}^{TOTAL}$. In some embodiments, one or more of venue databases may impose a maximum size of a geographic region to search.

Venue databases 160 may be any suitable storage or memory device and may include any number of storage devices. The included storage device(s) may be (1) distributed; (2) similar or disparate; or (3) may be local to each other or geographically dispersed. It should be appreciated that while two venue databases are illustrated here, system 100 may include fewer or more venue databases.

In some embodiments, one of venue databases 160 is the Foursquare venue search service. In some of these embodiments, DRRS server 150 accesses location based information from the one of venue databases 160 via an API.

In some embodiments where system 100 includes more than one venue databases 160, DRRS server 150 aggregates the information from at least two of the venue databases 160.

In some embodiments, the functions of one or more illustrated components reside in the same apparatus. For example, DRRS server 150 may reside in the same apparatus as one or more of location apparatus servers 140. Similarly, DRRS server 150 may reside in the same apparatus as one or more of venue databases 160.

Figure 2:
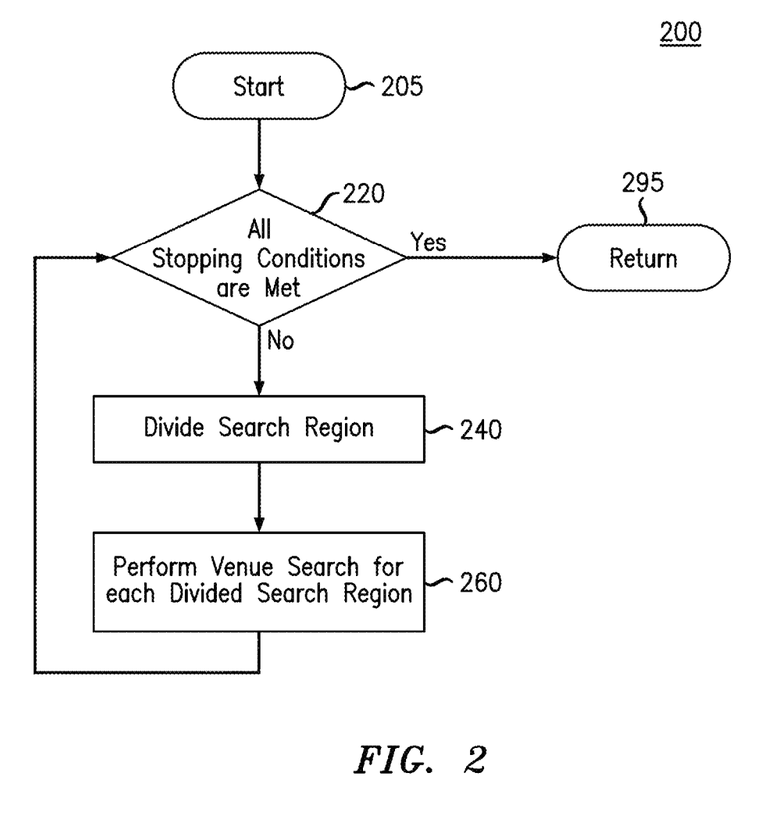
FIG. 2 depicts a flow chart illustrating an embodiment of a method 200 for a DRRS server (e.g., DRRS server 150 of FIG. 1) to collect venues within a defined geographic region in the location based services system 100 of FIG. 1.

FIG. 2 depicts a flow chart illustrating an embodiment of a method 200 for a DRRS server (e.g., DRRS server 150 of FIG. 1) to collect venues within a defined geographic region in the location based services system 100 of FIG. 1. In particular, method 200 is an exhaustive search. The method includes: determining whether stopping conditions are met (step 220), dividing the search region (step 240) if the stopping conditions are not met and performing venue searches for the divided search regions (260). After step 260 the method returns to step 220.

In the method 200, the step 220 includes determining whether stopping conditions are met. In particular, stopping conditions are the conditions that indicate exhaustive venue collection within the identified geographic region is complete. Exhaustive venue collection is a method designed to retrieve a complete set of in-venues from a given geographic region.

In the method 200, the step 240 includes dividing the search region. In particular, search regions are divided to a size that does not violate the return limit or the smallest resolution of the venue database (e.g., one of databases 160 of FIG. 1).

In the method 200, the step 260 includes performing a venue search for the regions divided in step 240. In particular, a query of the venue database to retrieve the set of in-venues within the divided geographic region is performed.

In some embodiments, the method 200 is smallest resolution search. In some of these embodiments, the geographic region is divided in a grid of smallest resolution search regions and a venue search is performed on each reason. In these embodiments, the stopping conditions may be the completion of searching each of the smallest resolution search regions in the grid. It should be appreciated that many search algorithms may specify a minimum defined search region or the observed results of searches in regions smaller than a threshold minimum size may return the same venue results. In some of these embodiments, the imposed minimum defined search region or threshold minimum size is the smallest resolution search region. For example, we have observed that in results returned from Foursquare, when the latitude or longitude of the bounding box is as small as $4.8828 \times 10^{-5}$, queries on any sub-boxes return the same set of venues as the bounding box. This indicates that the smallest resolution handled by the Foursquare API is equivalent to roughly $4.8^2$ m$^2$ at the equator and $2.4^2$ m$^2$ at 60° latitude.

In some embodiments, the method 200 is a two dimensional binary division algorithm. In some of these embodiments, method 200 is as described in FIG. 3.

In some embodiments, step 220 occurs after step 260.

Figure 3:
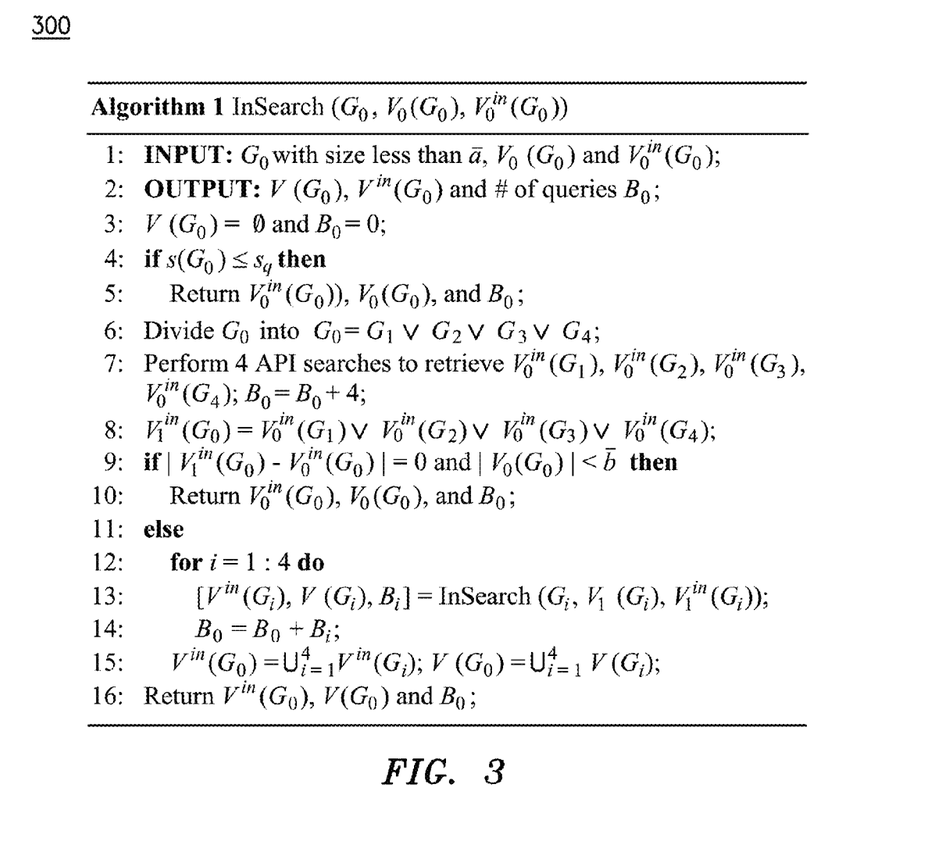
FIG. 3 illustrates one embodiment of the method 200 of FIG. 2.

Referring to FIG. 3, the Insearch algorithm is explained below.

In line 1, InSearch receives $G_0$, $V_0(G_0)$ and $V_0^{in}(G_0)$ as inputs. Where $G_0$ is a geographic region with a size less than a threshold $\bar{a}$, $V_0(G_0)$ is a set of venues, and $V_0^{in}(G_0)$ is a set of in-venues.

In line 2, InSearch outputs $V(G_0)$, $V^{in}(G_0)$ and $B_0$. Where $V(G_0)$ is a set of venues, and $V^{in}(G_0)$ is a set of in-venues, and $B_0$ is the cost of the algorithm specified in the number of queries performed.

In line 3, the variables are initialized: $V(G_0)$ to an empty set and $B_0$ to zero.

Optionally, in line 4, if the size of the geographic region $G_0$ is less that a smallest resolution $s_q$, then the method returns in line 5.

In line 6, geographic region $G_0$ is divided into four (4) regions; in line 7 four (4) searches are performed on the divided regions to return in-venues; and in line 8 venue set $V_1^{in}(G_0)$ is set to include the in-venues returned in line 7. It should be appreciated that since four (4) searches have been performed, the cost $B_0$ is incremented by four (4) in line 7.

In line 9, current in-venue set $V_1^{in}(G_0)$ is compared to previous in-venue set $V_0^{in}(G_0)$ to determine whether any new in-venues have been collected and total previous venue set $V_0(G_0)$ is compared to a return threshold $\bar{b}$ to determine whether the returned set of venues is less threshold. It should be appreciated that comparing the set of new in-venues against previous in-venues protects against instances where a returned set of venues is less than the return threshold $\bar{b}$, but the actual number of venues in the geographic region is more than the return threshold $\bar{b}$. For example, we have observed that in some instances in Foursquare, a query on a geographic region may return less than 50 venues (e.g., the return limit), when there are actually more than 50 in that geographic region. This observation indicates that a return with less than $\bar{b}$ venues may not be sufficient to indicate the completeness of the return.

In line 10, if the test in line 9 is satisfied then the method returns.

In line 12, if the test in line 9 is not satisfied, then the method recursively performs an InSearch call for the four (4) divided regions (line 13) and increments the cost $B_0$ by the cost of the respective InSearch algorithm (line 14).

In line 15, $V^{in}(G_0)$ is set to the union of the four (4) InSearch calls for the in-venues of the divided regions in step 13 and $V(G_0)$ is set to the four (4) InSearch calls for the venues of the divided regions in step 13.

In line 16, the method returns.

In some embodiments, line 9 may be replaced by a test whether the venues in $V_1(G_0)$ is less than a return threshold $\bar{b}$. In some embodiments, line 4 may further include a test comparing whether the venues in $V_1(G_0)$ is less than a return threshold $\bar{b}$ and line 9 and 10 may be removed.

In some embodiments of line 9, the return threshold $\bar{b}$ may be the return limit of the venue database. In other embodiments, the return limit $\bar{b}$ may be the return limit less a buffer threshold.

In the some embodiments of the algorithm of FIG. 3, the stopping conditions are: (1) (a) the number of returned venues being less than the return threshold $\bar{b}$; and (b) the returned in-venue set obtained by going one level further does not add any new in-venues; (line 9) or (2) the smallest resolution has been reached (line 4).

Figure 4:
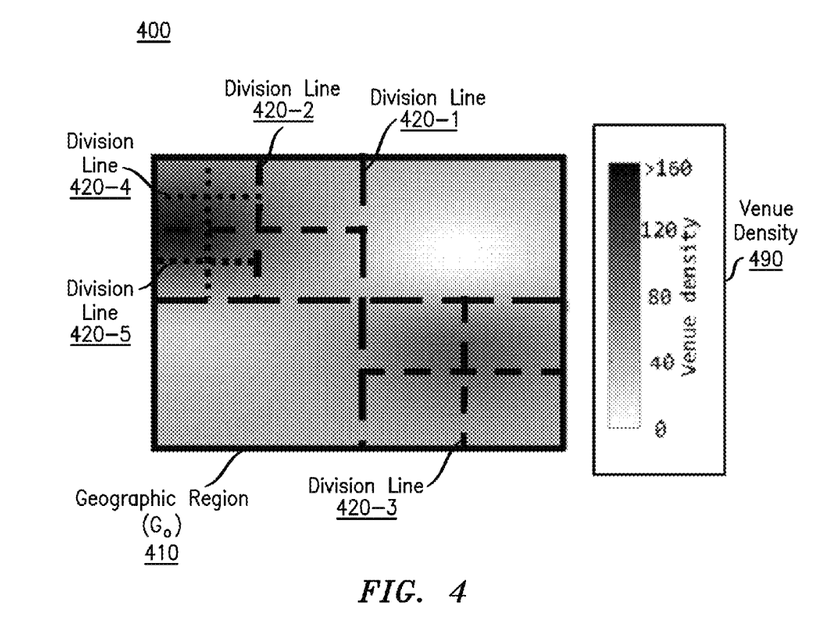
FIG. 4 illustrates the exhaustive search algorithm of FIG. 3.

Referring to FIG. 4, the exhaustive search algorithm of FIG. 3 is illustrated. The density of the shading within geographic region 410 is depicted in venue density colorbar 490. As illustrated, darker shaded areas of geographic region 410 have higher venue densities. At level 0, the InSearch routine of FIG. 3 is called. At level 1, two dimensional binary division is applied to geographic region 410 to create the four first division regions separated by division line 420-1 and four API searches are performed on the four (4) first division regions. As illustrated in the InSearch algorithm of FIG. 3, the four first division regions are subdivided by division lines 420-2-420-5 until the stopping conditions are met. It should be appreciated that the less dense of the regions will be subdivided less (e.g., the upper right quadrant of geographic region 410 is not sub divided further while the upper left quadrant of geographic region 410 is further subdivided by division lines 420-2, 420-4 and 420-5.

Figure 5:
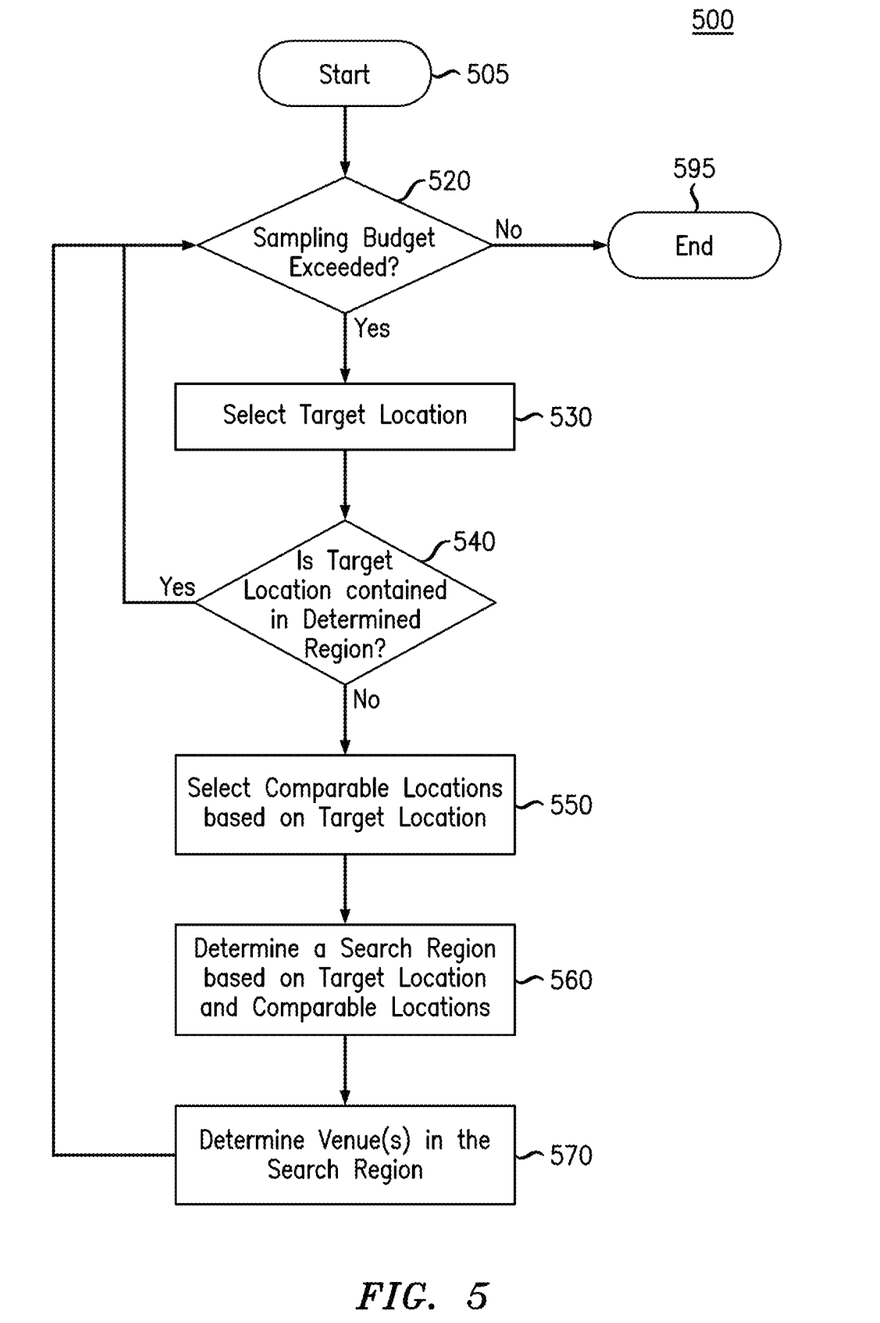
FIG. 5 depicts a flow chart illustrating an embodiment of a method 500 for a DRRS server (e.g., DRRS server 150 of FIG. 1) to collect venues within an identified geographic region in the location based services system 100 of FIG. 1 using dynamic random region sampling (DRRS)

FIG. 5 depicts a flow chart illustrating an embodiment of a method 500 for a DRRS server (e.g., DRRS server 150 of FIG. 1) to collect venues within an identified geographic region in the location based services system 100 of FIG. 1 using dynamic random region sampling (DRRS). The method includes: determining whether a sampling budget is exceed (step 520) and based on the determination, ending the method (step 595) or determining venues in the identified geographic region. Determining venues in the identified geographic region includes: selecting a target location within the geographic region (step 530); optionally determining whether the target location is contained in a geographic region where the included venues has already been determined (step 540) and based on the determination, returning to step 520 or proceeding to step 550. In step 550, comparable locations are chosen based on the target location (step 550), a search region is determined based on the target location and the comparable locations (step 560), venues in the search region are determined (step 570), and the method returns to step 520.

In the method 500, the step 520 includes determining whether a sampling budget is exceeded. Based on the determination, the method either proceeds to steps 530 or returns (step 595). In particular, a budget identifies a threshold amount of resources to use in determining the venue distribution within the identified geographic region and if the threshold is exceeded, the method returns. A budget may be any suitable parameter. For example, in some embodiments the budget is a threshold number of venue retrieval requests that may be performed.

In the method 500, step 530 includes selecting a target location within the geographic region. In particular, a location "ll" is randomly chosen from within the identified geographic region.

The method 500 optionally includes step 540. Step 540 includes determining whether the target location is contained in a geographic region where the included venues has already been determined. Based on the determination, the method either proceeds to steps 540 or returns to step 520. In particular, if a previously valid and determined geographic sub-region of the identified geographic region exists, the method may determine that the set of venues in that previously determined geographic sub-region does not need to be determined again. Any suitable method may be used to determine that a geographic sub-region is valid such as, for example, (1) using a time stamp and a valid time threshold to determine whether the sub-region has been determined within the valid time threshold period; or (2) using the existence of the geographic sub-region to indicate that the sub-region is valid. In some of these embodiments, older sub-regions may be removed.

In the method 500, step 550 includes determining comparable locations based on the target location. In particular, two or more locations within the identified geographic region are determined based on: (1) the locations having known venue densities; and (2) the comparable locations being determined to be of the highest relevance to the target location when compared to other known comparable locations. Highest relevance may be determined using any suitable method. For example, highest relevance may be determined by selecting the two more comparable locations that are geographically in closest proximity to the target location.

In the method 500, step 560 includes determining a search region based on the target location and the comparable locations. In particular, the coordinates of the search region are based on the target location and the area of the search region is based on the venue densities of the comparable locations.

Advantageously, by taking venue density distribution into consideration, the dynamic random region sampling algorithm may adaptively adjust the sizes of the sampled regions based on the comparable locations, providing accurate estimation results under efficient query budget constraints.

In the method 500, step 570 includes determining venue(s) in the search region. In particular, an exhaustive search algorithm (e.g., method 200 of FIG. 2) is performed to determine the set of in-venues within the search region.

In some embodiments of the step 550, boundary coordinates may be used as initial comparable locations. For example, a north-east corner and a south-west corner of a rectangular region may be used as initial comparable locations for the first randomly chosen location.

In some embodiments of the step 550, data from previous DRRS sampling executions may be utilized. For example, if the DRRS server (e.g., DRRS server 150 of FIG. 1) performs the method 500 daily, saved parameters such as: previous set(s) of {locations, venue} density pairs, previous set(s) of sample regions, or previous set(s) of in-venues may be utilized in the current execution of the method 500. In some of these embodiments, previous set(s) of data may be determined to be valid based on a data collection timestamp. It should be appreciated that the method 500 may decline to use invalid (e.g., aged) dataset(s). For example, in step 550, the determination of comparable locations may be based on valid and known locations. It should be appreciated that by using prior datasets the efficiency and accuracy of the method 500 may be improved.

In some of these embodiments, the method may further include a dataset cleanup step. In particular, dataset(s) that are no longer valid may be periodically purged from the system.

In some embodiments of the step 550, the venue density association is based on weights given to a number of determining factors as described herein.

In some embodiments of the step 550, the highest relevance is based on geographic terrain. Geographic terrain may be any suitable characteristic such as: (a) a characterization of an area (e.g., rural, suburb, or urban); (b) an indication of the traffic in the area (e.g., as reported by Google maps); (c) an indication of the population density of the area; (d) an indication of the density of establishments in the area; (e) an indication of the terrain (e.g., mountainous, forest or water); (f) a zoning characteristic (e.g., zoned as residential or business); or (g) the like. For example, a target density that is located within an urban area will more likely (e.g., higher weight) be associated with comparable locations that are also in urban areas as opposed to those in rural areas or located within terrain such as a body of water or a mountainous region. In some of these embodiments, the apparatus performing the method maintains a map of the identified geographic region. In some of these embodiments, the apparatus performing the method retrieves a map of the identified geographic region via a query to a mapping service (e.g., Google maps).

In some embodiments of the step 550, the highest relevance is based on the orientation of the comparable locations. For example, if a first highest relevant comparable location is located due west of the target location, a weight will be given to choose a second comparable location that is located to the east of the target location. It should be appreciated that a second comparable location may not exist due east and that the orientation of the second comparable location may be used in weighting the determination.

In some embodiments of the step 560, the search region is centered around the target location.

In some embodiments of the step 560, the search region is trimmed so as not to include areas from previously determined search regions. It should be appreciated that in some of these embodiments, the initial determined search region will be centered on the target location, but the resulting trimmed search region may no longer be physically centered. In these embodiments, the centering of the search region will be based on the initial determined search region.

In some embodiments, step 520 may be performed after another step such as after step 570. In this embodiment, steps 540 and 570 may return to step 530.

In some embodiments, the method 500 is a dynamic random region sampling algorithm. In some of these embodiments, method 500 is as described in FIG. 6.

Figure 6:
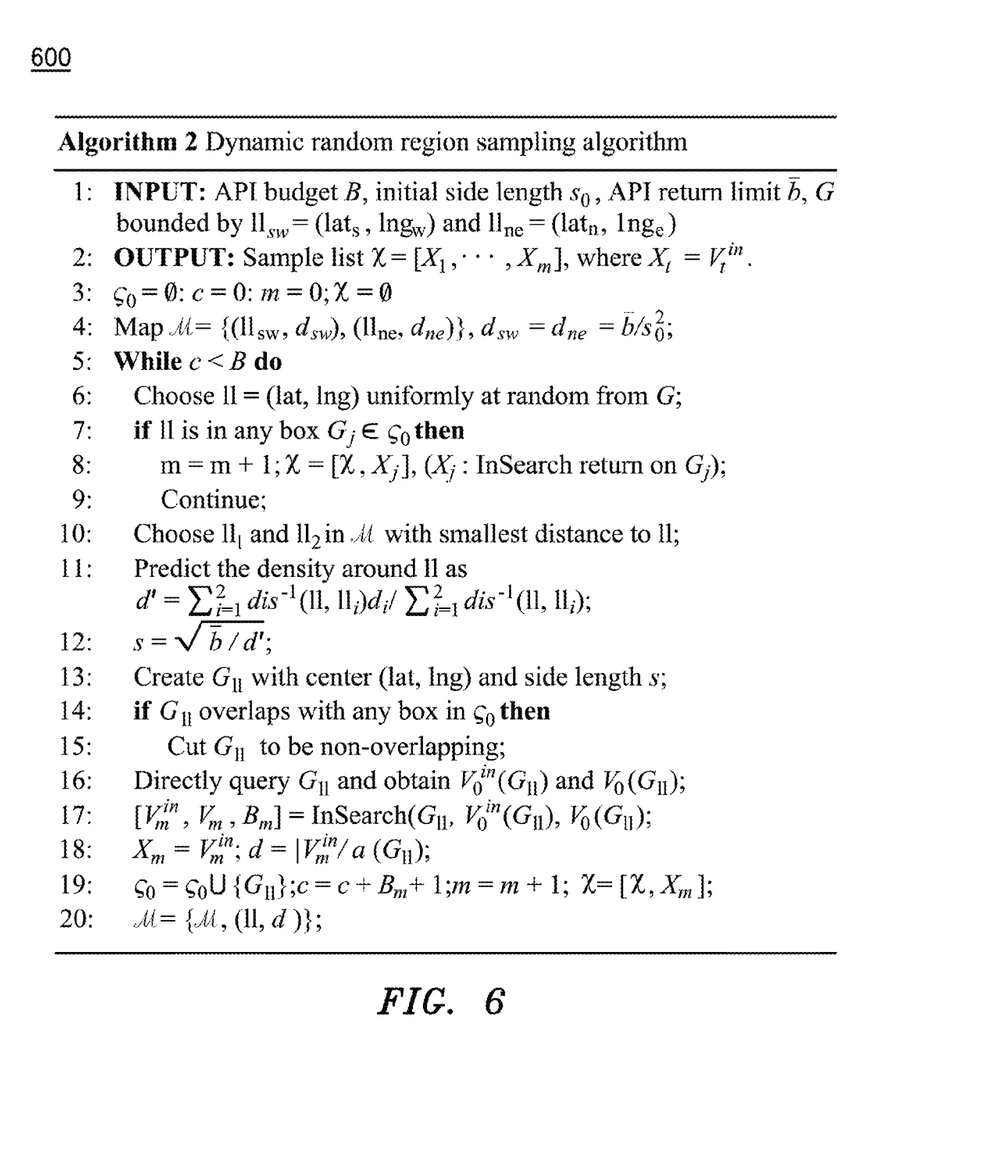
FIG. 6 illustrates one embodiment of the method 500 of FIG. 5.

Referring to FIG. 6, the DRRS algorithm is explained below.

In line 1, input parameters are defined. Where B is the budget (e.g., search limit) of the resources to be used by the DRRS algorithm; $\bar{b}$ is the return limit specifying the maximum number of venues that will be returned in a query; and G is the objective search region defined by: $ll_{sw}$, and $ll_{ne}$ the upper right and bottom left corners; and $s_0$, is the initial side length of the initial search region inside G. It should be appreciated that though while the initial search region is a square in this illustration, the initial search region may be any shape. As such, computed parameters such as area may be computed in any suitable manner. It should be further appreciated that an initial side length may be determined from the bounding coordinates $ll_{sw}$ and $ll_{ne}$ and thus may not be an input into the DRRS algorithm.

In line 2, outputs are defined. Where X is the set of in-venues returned. Obtained from the exhaustive venue search on sampled regions.

In lines 3 and 4, parameters are initialized. Where $G_0$ contains the set of sample regions, c represents the capturing cost, m represents the number of sample regions obtained, and M contains the set of {locations, venue} density pairs. As illustrated, X is initialized to a null set and M is initialized with estimated venue densities for bounding locations $ll_{sw}$ and $ll_{ne}$.

In lines 6-8, a location ll is chosen randomly and if location ll is within any of the regions $G_j$ that are a member of the set of $G_0$ regions, then $G_j$ is considered sampled again and the set X is updated based on the prior in-venue search of region $G_j$ and no sampling budget is spent. In some embodiments, the in-venues determined to be in region $G_j$ are used to populate the set of venues in X.

In lines 10, at least two comparable locations (e.g., $ll_1$ and $ll_2$) contained in set M with the highest relevance to the target location are selected. In this illustration, the highest relevance is based on the smallest distance between the locations in the set M and the target location.

In lines 11-13, a new region, $G_n$, is created based on the target location ll and the comparable locations $ll_1$ and $ll_2$. In particular, comparable locations $ll_1$ and $ll_2$ are used to predict the venue density of the chosen location ll (line 11). Where the function "dis" returns a distance weighting between two locations and d' is the predicted density of the new region centered on target location ll. In line 12, the predicted density d' and the return limit $\bar{b}$ are used to calculate a side length that defines the area of the new region (e.g., as illustrated, a square region). It should be appreciated that the use of the return limit $\bar{b}$ in the side length calculation may keep the expected number of venues returned in this new region close the API return limit $\bar{b}$. In line 13, new region $G_n$ is centered on the latitude and longitude coordinates of target location Il. In some embodiments of line 12, a threshold may be subtracted from the API return limit $\bar{b}$ (e.g., $s=\sqrt{(\bar{b}-threshold)/d'}$). It should be appreciated that the threshold may reduce the number of instances where the venue search returns a number of venues equally in the API return limit.

In lines 14 and 15, the DRRS algorithm trims $G_{II}$ so that $G_{II}$ does not overlap with any other stored region in $G_O$.

In lines 16 and 17, an exhaustive search (e.g., method 200 of FIG. 2) is performed on region $G_{II}$ to obtain the set of venues (e.g., $V_m$) and in-venues (e.g., $V_m^{in}$) within region $G_{II}$ as well as the cost (e.g., $B_m$) associated with obtaining the sets of venues and in-venues.

In line 18, the set X is updated with the set of in-venues $V_m^{in}$ obtained in line 17 and the actual density is determined for region $G_{II}$. Where a ($G_{II}$) represents the area of region $G_{II}$.

In lines 19-20, the algorithm variables are updated.

Figure 7:
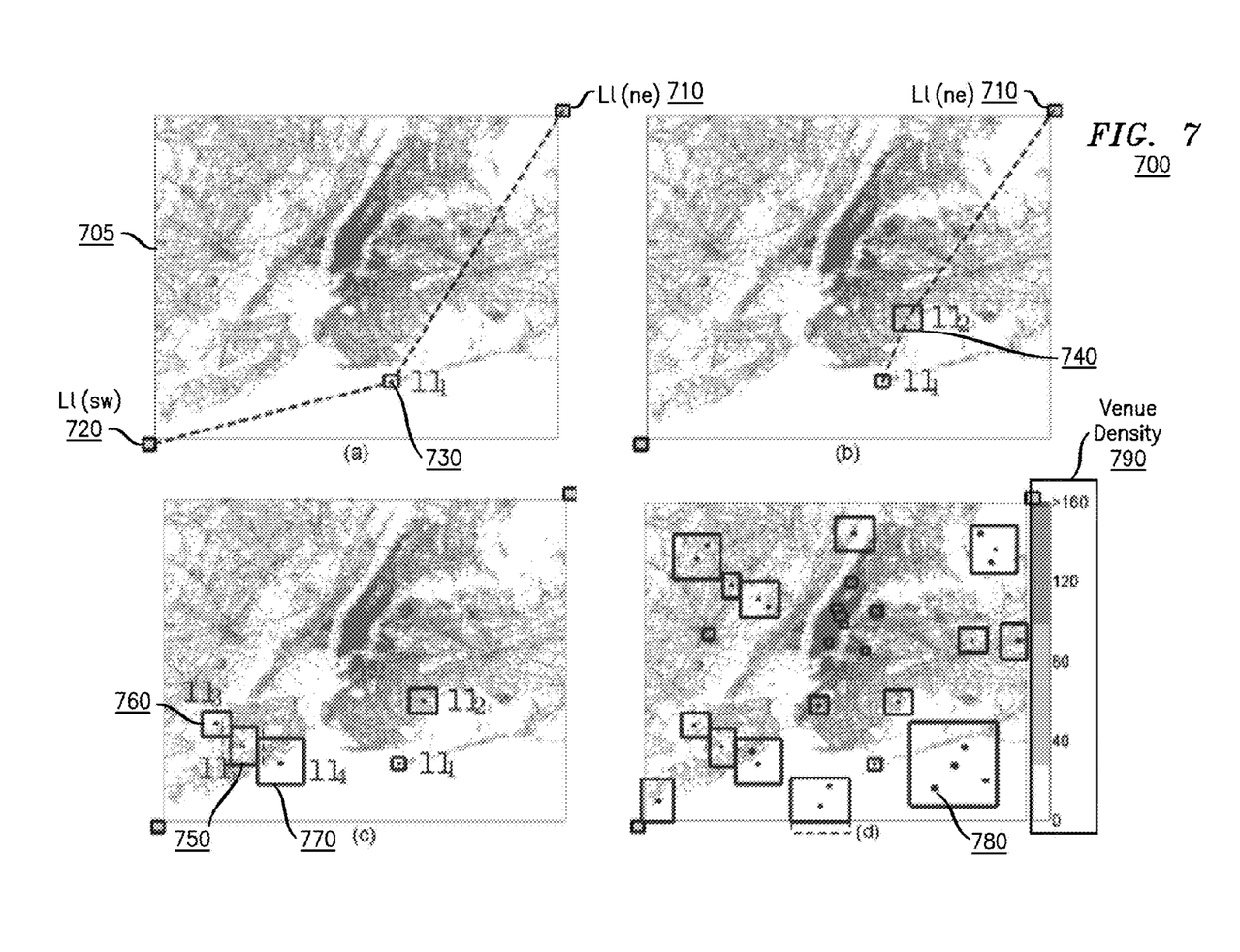
FIG. 7 illustrates the DRRS search algorithm of FIG. 6.

Referring to FIG. 7, the DRRS algorithm of FIG. 6 is illustrated using a portion of New York City. The density of the shading within geographic regions (a)-(d) is depicted in venue density colorbar 790. As illustrated, darker shaded areas have higher venue densities. In (a), location $Il_1$ represents the current randomly chosen location and Il(ne) 710 and Il(sw) 720 represents the bounding coordinates of the search region 705. The calculated region 710 is centered on location $Il_1$ and is sized based on the weighted average of the venue densities associated with comparable locations Il(ne) 710 and Il(sw) 720. In (b), second region 740 is generated based on randomly chosen location $Il_2$ and highest relevant (e.g., "nearest") locations $Il_1$ and Il(ne) 710. Similarly in (c), the fifth region 750 is generated based on randomly chosen location $Il_5$ and highest relevant locations $Il_3$ and $Il_4$. It should be appreciated that fifth region 750 is trimmed to eliminate overlap between itself and neighboring previously generated regions (e.g., regions 760 and 770). In (d), after a number of iterations a sequence of sample regions are formed. It should be appreciated that as more sample boxes are formed the predicted densities estimation may improve. Note that some locations falling into already sampled boxes (e.g., 780) will trigger the corresponding boxes to be re-sampled.

Although primarily depicted and described in a particular sequence, it should be appreciated that the steps shown in methods 200 and 500 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 8:
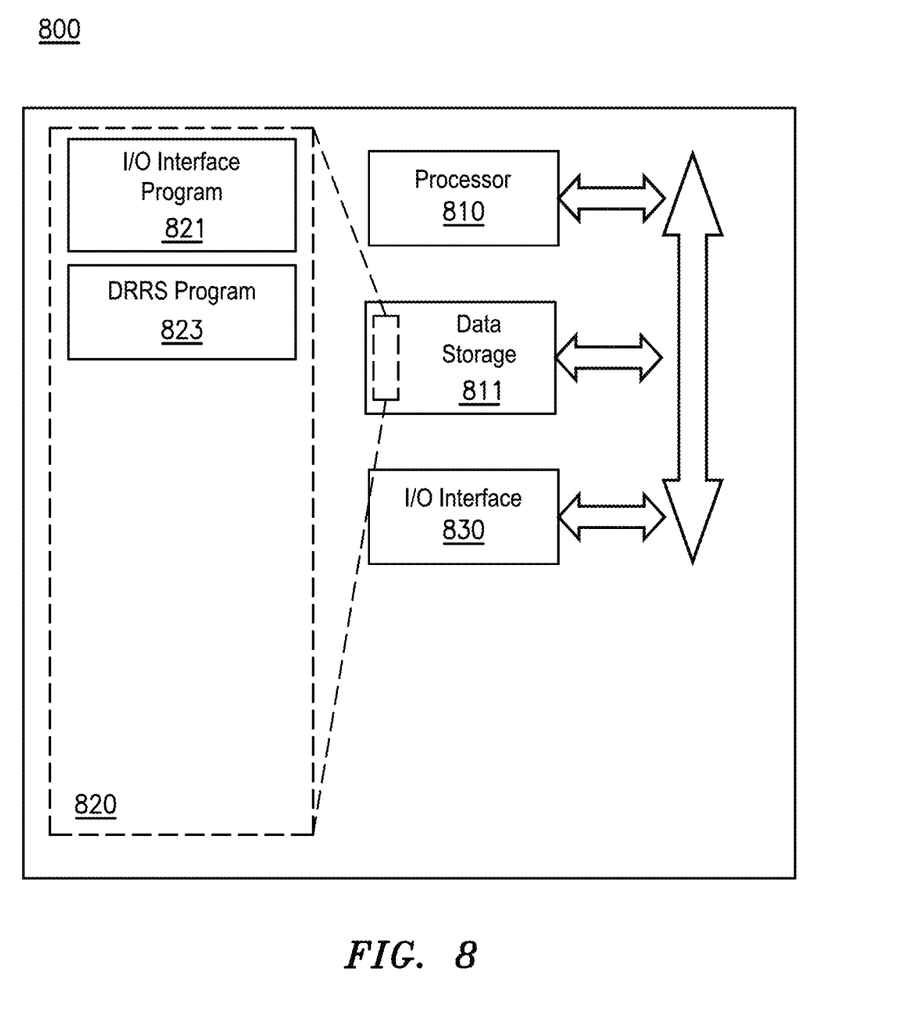
FIG. 8 schematically illustrates an embodiment of various apparatus 800 such as DRRS server 150 of FIG. 1.

FIG. 8 schematically illustrates an embodiment of various apparatus 800 such as one of DRRS Server 150 of FIG. 1. The apparatus 800 includes a processor 810, a data storage 811, and an I/O interface 830.

The processor 810 controls the operation of the apparatus 800. The processor 810 cooperates with the data storage 811.

The data storage 811 may store program data such as sets of venues, sets of {location, venue density} pairs, or the like as appropriate. The data storage 811 also stores programs 820 executable by the processor 810.

The processor-executable programs 820 may include an I/O interface program 821, or a DRRS program 823. Processor 810 cooperates with processor-executable programs 820.

The I/O interface 830 cooperates with processor 810 and I/O interface program 821 to support communications over DRRS server communication channel 155 of FIG. 1 as described above.

The DRRS program 823 performs the steps of method(s) 200 of FIG. 2 or 500 of FIG. 5 as described above.

In some embodiments, the processor 810 may include resources such as processors/CPU cores, the I/O interface 830 may include any suitable network interfaces, or the data storage 811 may include memory or storage devices. Moreover the apparatus 800 may be any suitable physical hardware configuration such as: one or more server(s), blades consisting of components such as processor, memory, network interfaces or storage devices. In some of these embodiments, the apparatus 800 may include cloud network resources that are remote from each other.

In some embodiments, the apparatus 800 may be virtual machine. In some of these embodiments, the virtual machine may include components from different machines or be geographically dispersed. For example, the data storage 811 and the processor 810 may be in two different physical machines.

When processor-executable programs 820 are implemented on a processor 810, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database (s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing venue datasets within a search region, the apparatus comprising:
   a data storage; and
   a processor communicatively connected to the data storage, the processor being configured to:
     randomly select a target location in the search region;
     select a first comparable location, the first comparable location having a first venue density;
     select a second comparable location, the second comparable location having a second venue density;
     determine a sub-region within the search region based on the target location, the first and second comparable locations, and the first and second venue densities; and
     determine a set of in-venues within the sub-region;
   wherein the first and second comparable locations are determined to have a higher relevance than other known locations within the search region.

2. The apparatus of claim 1, wherein the processor is further configured to:
   determine a sampling budget; and
   repeat (a)-(f) until the sampling budget is met;
     (a) randomly select a new target location in the search region;
     (b) select a new first comparable location, the new first comparable location having a new first venue density;
     (c) select a new second comparable location, the new second comparable location having a new second venue density;
     (d) determine a new sub-region within the search region based on the new target location, the new first and new second comparable locations, and the new first and new second venue densities; and
     (e) determine a set of new in-venues within the new sub-region;
     (f) wherein the new first and new second comparable locations are determined to have a higher relevance than other known valid locations within the search region.

3. The apparatus of claim 1, wherein the processor is further configured to:
   trim the sub-region based on a determination that the sub-region overlaps with at least one of a plurality of other known sub-regions within the search region.

4. The apparatus of claim 1, wherein the processor is further configured to:
   randomly select a second target location in the search region; and
   select the set of in-venues based on a determination that the second target location is located in the sub-region.

5. The apparatus of claim 1, wherein the area of the sub-region is based on a weighted average of the first and second comparable locations and the first and second venue densities.

6. The apparatus of claim 5, wherein the area of the sub-region is further based on a venue return limit.

7. The apparatus of claim 1, wherein the higher relevance is based on a distance between the first comparable location and the target location as compared to respective distances between the other known locations within the search region and the target location.

8. The apparatus of claim 7, wherein the higher relevance is further based on a first geographic terrain characteristic of the first comparable location and a second geographic terrain characteristic of the target location.

9. The apparatus of claim 7, wherein the higher relevance is further based an association between the orientation of the first comparable location with respect to the target location and the second comparable location with respect to the target location.

10. The apparatus of claim 1, wherein the determination of the set of in-venues comprises configuring the processor to perform an exhaustive venue search of the sub-region.

11. A method for providing venue datasets within a search region, the method comprising:
    at a processor communicatively connected to a data storage, randomly selecting a target location in the search region;
    selecting, by the processor in cooperation with the data storage, a first comparable location, the first comparable location having a first venue density;
    selecting, by the processor in cooperation with the data storage, a second comparable location, the second comparable location having a second venue density;
    determining, by the processor in cooperation with the data storage, a sub-region within the search region based on the target location, the first and second comparable locations, and the first and second venue densities; and
    determining, by the processor in cooperation with the data storage, a set of in-venues within the sub-region;
    wherein the first and second comparable locations are determined to have a higher relevance than other known locations within the search region.

12. The method of claim 11, wherein the method further comprises:
    trimming, by the processor in cooperation with the data storage, the sub-region based on a determination that the sub-region overlaps with at least one of a plurality of other known sub-regions within the search region.

13. The method of claim 11, wherein the method further comprises:
    randomly selecting, by the processor in cooperation with the data storage, a second target location in the search region; and selecting, by the processor in cooperation with the data storage, the set of in-venues based on a determination that the second target location is located in the sub-region.

14. The method of claim 11, wherein the area of the sub-region is based on a weighted average of the first and second comparable locations and the first and second venue densities.

15. The method of claim 11, wherein the higher relevance is based on a distance between the first comparable location and the target location as compared to respective distances between the other known locations within the search region and the target location.

16. The method of claim 15, wherein the higher relevance is further based on a first geographic terrain characteristic of the first comparable location and a second geographic terrain characteristic of the target location.

17. The method of claim 15, wherein the higher relevance is further based an association between the orientation of the first comparable location with respect to the target location and the second comparable location with respect to the target location.

18. A computer-readable storage medium storing instructions which, when executed by a computer, cause the computer to perform a method, the method comprising:
- selecting a first comparable location, the first comparable location having a first venue density;
- selecting a second comparable location, the second comparable location having a second venue density;
- determining a sub-region within the search region based on the target location, the first and second comparable locations, and the first and second venue densities; and
- determining a set of in-venues within the sub-region;
- wherein the first and second comparable locations are determined to have a higher relevance than other known locations within the search region.

\* \* \* \* \*